United States Patent [19]

Mumme

[11] Patent Number: 6,117,468
[45] Date of Patent: Sep. 12, 2000

[54] FOOD PORTION SURFACE SANITATION METHOD

[76] Inventor: Christian F. Mumme, P.O. Box 248, Eastport, Me. 04631-0248

[21] Appl. No.: 09/133,157

[22] Filed: Aug. 12, 1998

[51] Int. Cl.⁷ .................. A23F 5/00; A23C 3/00
[52] U.S. Cl. .......... 426/310; 426/326; 426/335; 426/532
[58] Field of Search ............... 426/326, 532, 426/335, 310; 422/28

[56] References Cited

U.S. PATENT DOCUMENTS

| | | | |
|---|---|---|---|
| 4,084,747 | 4/1978 | Alliger | 239/4 |
| 4,647,458 | 3/1987 | Veno et al. | 424/128 |
| 4,977,142 | 12/1990 | Green | 514/23 |
| 5,143,720 | 9/1992 | Lopes | 424/55 |

FOREIGN PATENT DOCUMENTS

| | | |
|---|---|---|
| 2636529 | 3/1990 | France . |
| 09084568 | 3/1997 | Japan . |

*Primary Examiner*—Nina Bhat
*Attorney, Agent, or Firm*—Charles A. McClure

[57] ABSTRACT

Food-portion surface sanitizing by liquid dipping or spraying with an antimicrobial composition appropriate for human consumption. Suitable as such sanitizing composition is an aqueous solution about two-thirds ethanol by volume, and containing minor concentrations of dissolved salt and/or tannin, each up to several percent by weight.

13 Claims, No Drawings

FOOD PORTION SURFACE SANITATION METHOD

TECHNICAL FIELD

This invention relates to surface-sanitizing food portions, by applying an antimicrobial composition thereto before their ingestion and concerns suitable compositions, also their formulation and use.

BACKGROUND OF THE INVENTION

Food is often consumed in portions produced considerably before being eaten and, therefore, subject to being contaminated meanwhile, as from human and animal carriers of potentially harmful microbes. Everyone who has ever received food portions in a cafeteria, diner, delicatessen, or under outdoor picnic or field-kitchen conditions risked becoming infected by ingesting food contaminated by harmful micro-organisms, mainly bacteria, but perhaps fungi and/or viruses.

Away from their preparation environment, food portions may well enter less controlled environments and suffer surface contamination. Accordingly, each individual food portion may pose a health hazard meriting individual attention meriting a surface-sanitizing effort.

Food portions, even if prepared and served up in a super-clean manner, may encounter microbe-bearing liquid or solid particulates in the ambient atmosphere, as from air-conditioning systems, or from normal human respiration, or from abnormal coughing or sneezing, for example, or accidental contact with animals, such as pets—or pests.

An effective sanitizing composition, conveniently applicable to food portions, could help to preserve a good existing level of food portion sanitation, or could even restore a satisfactorily sanitary surface of exposed food portions by the time for their ingestion.

This particular situation is distinguishable from more general sanitation/sterilization of bulk foods and of food utensils, which have received attention reflected in such U.S. Pat. No. 3,908,031 (1975) Ethanol Vapor Sterilization of Natural Spices and Other Foods (also fruits, grains, hydrogenated fats); U.S. Pat. No. 4,592,892 (1986) Aqueous Sterilizing Agents for Foods or Food Processing Machines and Utensils (aqueous solutions of ethanol, alkali carbonate, and trialkali phosphate); U.S. Pat. No. 4,977,142 (1990) Antiallergenic Agent (aqueous tannic acid, ethanol, benzyl alcohol against dust mites, plant allergens); and U.S. Pat. No. 5,611,939 (1997) for Methods for Inhibiting the Production of Slime in Aqueous systems (tannin plus a cationic monomer)—citing a number of literature references, including *Antimicrobial Properties* of Tannins, Scalbert, PHYTOCHEMISTRY, vol. 30, no. 12, 3875–3883 (1991); *Toxicity of Tannin Compounds to Microorganisms*, Field, in PLANT POLYPHENOLS, Hemingway, ed. 673–692 (1992).

The present effort is directed to surface sanitizing individual food portions, as at the site of their prospective ingestion.

SUMMARY OF THE INVENTION

A primary object of the present invention is to enable discrete food portions to be surface-sanitized shortly before being ingested.

Another object of this invention is to provide compositions for enabling desired sanitizing of food portions before being eaten.

A further object of the invention is provision of methods for accomplishing the desired sanitizing of pre-prepared food portions.

In general, the objects of this invention are attained by applying to food portions an aqueous solution of ethanol containing minor amounts of salt and/or tannin. Such a composition may be two-thirds ethanol by volume and a few percent of salt and of tannin by weight.

Other objects of this invention, together with methods and means for attaining the various objects, will become apparent from the following description of one or more embodiments thereof, being presented by way of example rather than limitation.

DESCRIPTION OF THE INVENTION

This invention is readily understood, without aid of a drawing, in the light of the following description and related commentary.

As used here, the expression "food portion" is used mainly in the common sense of designating a discrete quantity of a previously prepared foodstuff, individually segregated, often—not necessarily always—prewrapped, as in paper or plastic film, or even in a more rigid container, itself often metal-coated. Any wrapper or other container must be opened and/or removed, of course, before the food portion can be ingested. If not prewrapped, as on a dish or plate, the pre-ingestion exposure of the food portion to the atmosphere can be expected to be somewhat—perhaps very much—longer in duration, and possibly appreciably riskier to whichever person eats it.

The principal ingredient of the compositions of this invention is ethanol, which is readily available in various degrees of dilution with water, as may be indicated by either the volume percentage or the weight percentage of ethanol, or by the corresponding density of aqueous mixtures, or a so-called "proof" indicator, as follows:

D (specific gravity): P (proof); V (volume %); W (weight %).

These four characteristics or measures are interrelated, as follows:

$$P = 1.75 \times V = V/0.571 = 2.21 \times D \times W;$$

$$V = 1.26 \times D \times W = (D \times W)/0.794;$$

$$W = P/(2.21 \times D) = (0.794 \times V)/D.$$

High-proof (190 or 200) ethanol is preferred for reasons of economy.

Operable ethanol concentrations for compositions of the present invention fall within the range from about three-fifths to about three-fourths. Two-thirds is an optimal intermediate concentration, especially where the cost of ethanol is not so much of a constraint.

Besides water, the other ingredients of sanitizing compositions of this invention are salt (mainly sodium chloride) and tannin (an extract of tree bark or related plant tissues, primarily a catechol or pyrogallol—the tannin "tannic acid" is pentadigalloylglucose).

These secondary ingredients are accepted as bactericides and are also GRAS (generally recognized as safe—for human consumption).

All of the aforementioned ingredients are articles of commerce and are readily available to anyone through ordinary trade channels.

Formulation of compositions of the present invention does not require any unusual skill or precaution, just ordinary measuring equipment and methodology. Salt being water-soluble is conveniently provided pre-dissolved in water (i.e., as brine). Tannin is soluble in both ethanol and water, so it may be pre-added to either, and may conveniently be dissolved in the aqueous ethanol. Then the brine, in minor volume of about a quarter to a half—preferably about a third—of the ethanol volume, is readily mixed thereinto.

Resulting salt and tannin concentrations, with both present (as is preferable), are about a couple—at most several—percent each. These ingredients provide a synergistic sanitizing effect with the ethanol, although being present in such small amount as to avoid adversely affecting the taste of a food portion so treated. Moreover, each alone, and especially both together, discourage consumption of the ethanolic composition in beverage form, as might become a hazard of unrestricted handling of the treating liquid.

Application of the resulting composition of this invention to a food portion is readily accomplished by dipping such a food portion into the resulting liquid for a few seconds, to ensure its thorough wetting or by spraying the composite liquid onto all the surfaces of the food portion for an equivalent time and with like effect. The interior of the food portion is not intended to be affected, so the exposure should not continue long enough for such penetration. Once dipped or sprayed, the wetted food portion should be allowed to dry normally by evaporation of the applied liquid, or alternatively may be blown dry if clean air is readily available. After such surface treatment the food portion should be eaten before unnecessary added exposure that might tend to contaminate or re-contaminate it.

An independent laboratory AOAC Phenol Coefficient Assay of the effectiveness of preferred composition of this invention showed excellent results against *Salmonella Choleraesuis, Staphylococcus aureus, Streptococcus pyogenes,* and *Escherichia coli* at substantial dilutions. The first and last showed an equal phenol coefficient, whereas the 2nd and 3rd showed greater coefficients (1.4 & 1,2).

Additional convenience may be provided, wherever food portions to be treated according to this invention are prepackaged, by also prepackaging the sanitizing composition in a companion container, either as a part of—or apart from—the food portion wrapper itself.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

The claimed invention:

1. A method of making a food-portion sanitizing composition, including mixing brine of about one-eighth salt by weight with about three times its volume of high-proof ethanol.

2. Method according to claim 1, including a preliminary step of dissolving several weight-percent of tannin into one of the component liquids and then mixing the liquids together.

3. Method according to claim 1, including a supplementary step of dissolving several weight-percent of tannin into the solution of the mixed component liquids.

4. A food-portion surface-sanitizing method, comprising applying to such surface aqueous ethanol solution containing several weight percent of each of tannin and salt for a period of time effective to destroy harmful microorganisms present on the surface there.

5. A food-portion surface-sanitizing method according to the method of claim 4, including at least one of the following steps:

(a) dipping the food portion into the sanitizing composition, (b) spraying the sanitizing composition onto the food portion.

6. Prepackaged food portion sanitized according to claim 5, after having been unpackaged preparatory to such treatment and subsequent consumption.

7. A method of preparing and using a high-proof aqueous alcoholic solution as a food-portion sanitizer, comprising (a) preparing the sanitizer by pre-dissolving salt and tannin, to the extent of about several weight percent of each, in liquid, in obtaining the desired high-proof aqueous alcoholic solution; and (b) using the sanitizer by applying it as such solution to the surface of a prepared food portion, then enabling the wetted food portion to dry by evaporation of the liquid components.

8. The method of claim 7, including converting the salt to a brine by pre-dissolving it in water, then adding the resulting brine to aqueous alcohol in forming said aqueous alcoholic solution.

9. The method of claim 8, including pre-dissolving tannin in alcohol, and then adding the resulting alcoholic solution thereof to aqueous alcohol in forming said aqueous alcoholic solution.

10. The method of claim 9, wherein the alcohol in which the tannin is disolved is predominantly ethanol.

11. The method of claim 7, including pre-dissolving tannin in water, and then adding the resulting aqueous solution thereof to aqueous alcohol in forming said aqueous alcoholic solution.

12. The method of claim 7, wherein during end use of the sanitizer it is applied to the surface of the food portion by dipping the portion into a liquid container of the sanitizer.

13. The method of claim 7, wherein during end use of the sanitizer it is applied to the surface of the food portion by being sprayed thereonto.

* * * * *